Dec. 18, 1962     J. A. COOLEY     3,068,956
ACOUSTICO-ILLUMINATIVE TILE
Filed Aug. 4, 1960     4 Sheets-Sheet 1

John A. Cooley,
INVENTOR.

BY

ATTORNEYS.

Dec. 18, 1962    J. A. COOLEY    3,068,956
ACOUSTICO-ILLUMINATIVE TILE
Filed Aug. 4, 1960    4 Sheets-Sheet 2

John A. Cooley,
INVENTOR.

BY
ATTORNEYS.

Dec. 18, 1962 J. A. COOLEY 3,068,956
ACOUSTICO-ILLUMINATIVE TILE
Filed Aug. 4, 1960 4 Sheets-Sheet 3

John A. Cooley,
INVENTOR.

BY
ATTORNEYS.

Dec. 18, 1962 J. A. COOLEY 3,068,956
ACOUSTICO-ILLUMINATIVE TILE
Filed Aug. 4, 1960 4 Sheets-Sheet 4

John A. Cooley,
INVENTOR.

BY
ATTORNEYS.

# United States Patent Office

3,068,956
Patented Dec. 18, 1962

3,068,956
ACOUSTICO-ILLUMINATIVE TILE
John A. Cooley, 3724 Manor Road, Apt. 1,
Chevy Chase, Md.
Filed Aug. 4, 1960, Ser. No. 47,569
2 Claims. (Cl. 181—33)
(Granted under Title 35, U.S. Code (1952), sec. 266)

The invention described herein may be manufactured and used by or for the Government, for governmental purposes, without the payment of any royalty thereon.

This invention relates to acoustic tiles, and more particularly to an improved acoustic tile having light and sound controlling qualities.

There has always been a demand for superior acoustic insulation in research laboratories, offices and similar places. Oftentimes a coincident need has been felt for an effective means for the control of both light and acoustic qualities. Good acoustical qualities in theaters and auditoriums, coupled with a pleasing light distribution, is always a prime aesthetic consideration. Further, in laboratories and offices, a good light distribution, as well as controlled acoustics tend to improve work conditions and increase work output of the personnel. Further research into the effects of various combinations of light and sound reflection and absorption as a continuing field of investigation.

One manner in which acoustical control is obtained, is through the distribution of acoustical tiles, usually sound-absorbant, throughout a room in strategic locations. Reflection of sound, where desired, is often controlled by the introduction of one or more hard wall surfaces. Each of these control devices, however, provides only a partial answer to the total problem, for exact control to achieve optimum acoustical results is extremely difficult. When the rare and happy coincidence of a perfect acoustical environment occurs, the room, if a laboratory, is enhanced in value, and if an auditorium will reward an audience due to the accomplishment of a perfect acoustical environment. The problems facing the architect and decorator in regard to light distribution is equally great, for to get correct light distribution without cumbersome reflectors or an unbounded multiplication of light sources is quite difficult.

Therefore it is the purpose of this invention to provide a method and structure for controlling both acoustics and light distribution.

It is another purpose to provide an improved sound absorbing structure.

It is another purpose to provide a method of producing an improved sound absorbing structure.

It is a further purpose of this invention to provide a pleasing and attractive acoustic tile.

The present invention may take the form of an acoustic tile, made from any suitable substance, such as pressed wood fibre, cellulose, asbestos, etc. The surface of the tile, rather than being relatively smooth, or simply punctured as found in prior art devices, is pressed, formed or cut into a number of serried pyramidal or quasi-pyramidal shapes. The pyramidal shape has been found to be a singularly efficient sound absorbent design due to its large surface area and sound-scattering, angled surfaces. The construction of a tile, as described above, will result in substantially improved acoustical qualities in a room; however, it is not the aim of this invention to merely provide a superior acoustic tile, but to provide a means of controlling both light and sound, through the agency of such a tile.

It can be appreciated that a hard flat surface will reflect sound to a much greater degree than will a resilient, cellular surface. Therefore, if it is desired to absorb sound from one direction, and reflect it from another direction, the aforementioned tile may be so treated that the pyramid faces directed toward the point from which it is desired to reflect sound are hard surfaced, while those oriented toward the direction from which it is desired to absorb sound may be treated to produce a resilient and sound absorbing surface. In a similar manner, it is possible to control light reflection and absorption by means of light colored and dark colored surface treatment.

It should be realized that each tile being of pyramidal form offers a number of sides. Each of the sides may be variously and selectively treated so as to have a number of configurations and combinations of sound absorbing, sound reflecting, light absorbing and light reflecting surfaces. By proper choice of these configurations on the sides of the tiles, a wide range of variation may be obtained in both acoustical and lighting treatment so as to achieve optimum qualities in a given environment.

This invention will be better understood by reference to the following description, taken with the drawings, in which.

Figure 2:
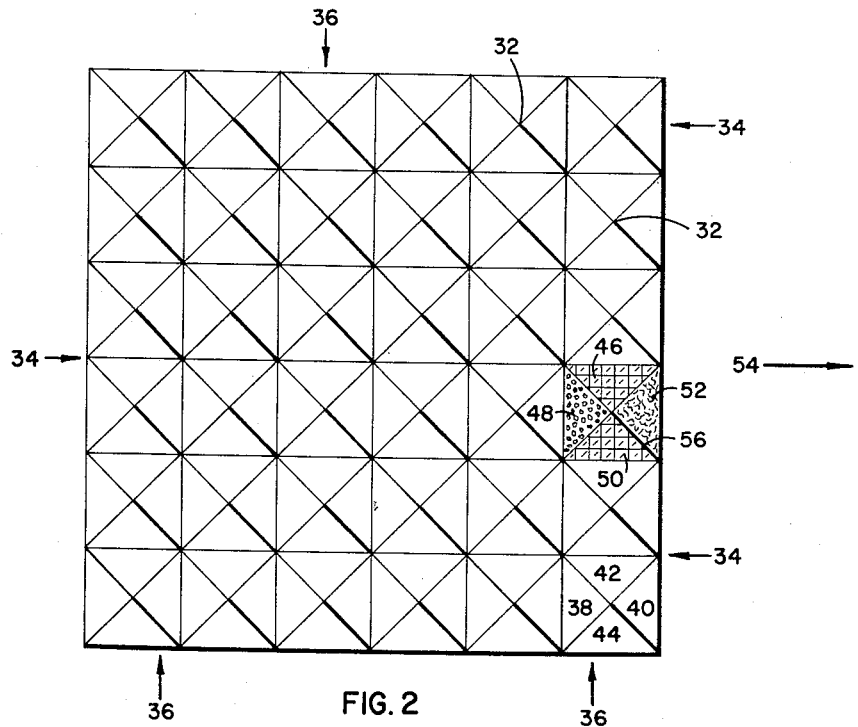
FIGURE 2 is a plan view of the embodiment of FIGURE 1.
Figure 1:
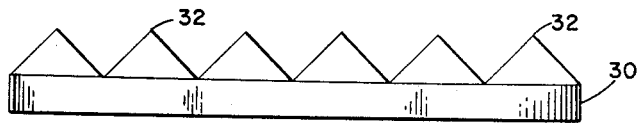
FIGURE 1 is an elevational view of one embodiment of the invention.
Figure 3:
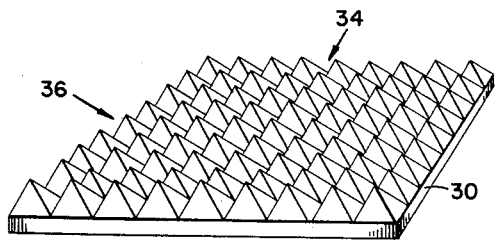
FIGURE 3 is a perspective view of one side of a tile showing an embodiment of the invention.
Figure 4:
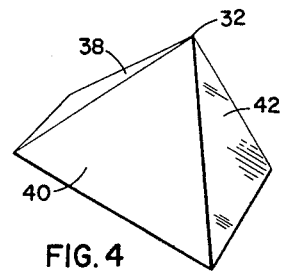
FIGURE 4 represents a single, detached pyramidal shaped tile.

Referring to FIGURES 1 and 3, 30 indicates the base, or support board which bears a number of small pyramidal structures 32, arranged in rows 34 and columns 36. The surfaces of the pyramids 32, as shown in FIGURE 2, are treated according to the desired function (FIGURES 1 and 4), with sound absorbent 38, sound reflecting 40, light reflecting 42 or light absorbing 44 surface preparations. Any one face of the pyramidal structures may bear any one or a combination of these surface preparations on any face. Further various combinations of light and sound properties may be employed on a single face of each pyramidal structure. Generally each of the pyramidal structures on the base 30 unit will have their corresponding faces alike in surfacing and orientation.

The sound and light reflecting and absorbing surfaces may be given their special properties by means of paint, coatings, impregnations, roughing, deposits, carbonizing, dimpling and other various methods of producing a surface of the desired properties. Henceforth all such finishes possessing the desired properties of light and sound reflecting or absorbing on the pyramidal faces will be referred to as "specially treated surfaces," and a complete tile, with any of these surface conditions will be referred to as an "acoustico-illuminative tile."

In operation, the acoustico-illuminative tile will be treated to produce the desired combination of properties on its surfaces. For example, suppose a case in which the tile will be used on the ceiling of a small auditorium, the following analysis might be made. In FIGURE 2, consider arrow 54 to indicate the direction of the stage, and pyramid 56 be representative of all the pyramids on a tile. Supposing, in this case, it is desirable to: (a) reduce audience noises (from a direction opposite the stage), (b) give a "live" quality to sound from the stage, (c) reflect incident light onto the stage, (d) keep reflected light away from the audience, (e) let incident light be reflected toward the side walls to relieve darkness without annoying the audience, and (f) absorb any echoes coming from the walls in order to control reverberation.

To solve the above problem by conventional means would be extremely difficult and expensive, involving a large complex of sound absorbent and reflecting structures and special lighting. By the utilization of the present invention however, the desired results could be readily attained by installation of an acoustico-illuminative tile 30 (FIGURE 1) having the following configuration of specially treated surfaces:

Surface 48 of each pyramidal structure would be sound absorbent and light absorbent, filling the needs set forth in (a) and (d) above. Surfaces 46 and 50 of each pyramidal structure would be sound absorbent and light reflecting to fill the needs of (e) and (f), while the surface 52 of each structure would be sound and light reflecting in order to fill the purposes of (b) and (c) above. It can be seen from this example, therefore, that the subject invention is one of extreme versatility, capable of being employed in a multitude of situations, and able to solve many widely varied acoustic problems, some of which were heretofore considered nearly impossible of solution. It will be understood that the required number of such tiles will be employed to achieve the total desired effect.

Figure 5:
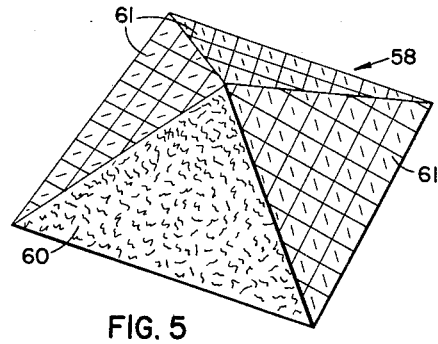
FIGURE 5 shows one example of the treatment applied to the pyramidal shaped tile.
Figure 6:
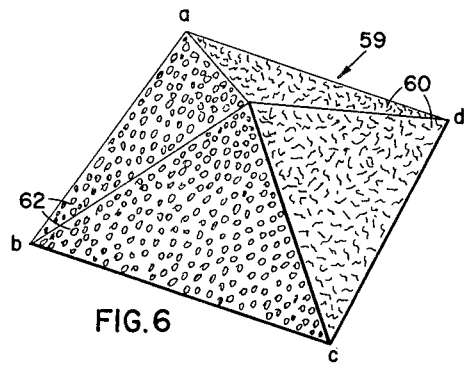
FIGURE 6 shows another example of treatment of the tile.
Figure 7:
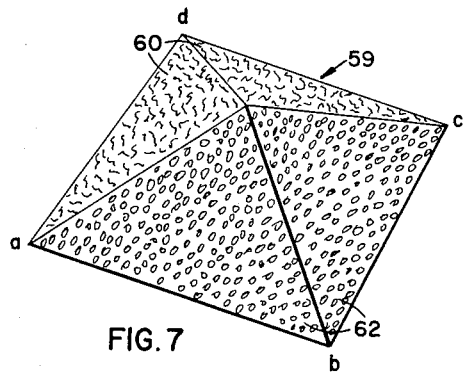
FIGURE 7 shows that rotating the pyramid of FIGURE 6 does not change configuration.

Another example of the possible surface treatments is represented by FIGURE 5, where a light reflective sound reflective surface 60 and three light reflective sound absorptive surfaces 61, are combined on one pyramid 58. Of course, while positional requirements can be varied, that is, the position of the surfaces on the tiles in relation to each other, the tile's spatial orientation should also be considered. For example, the pyramid 59 shown in FIGURE 6, having two light and sound absorptive surfaces 62 and two light reflective sound reflective surfaces 60, is not changed by rotation about the axis of the pyramid, as shown by the relative positions of the pyramid's base corners a, b, c and d in FIGURES 6 and 7, although the effect while in use would be greatly different.

Figure 8:
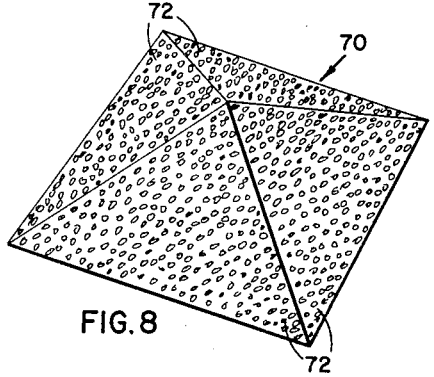
FIGURES 8 through 10 show various illustrative examples of the different treatments of the tile surfaces to achieve various desired acoustical effects.
Figure 9:
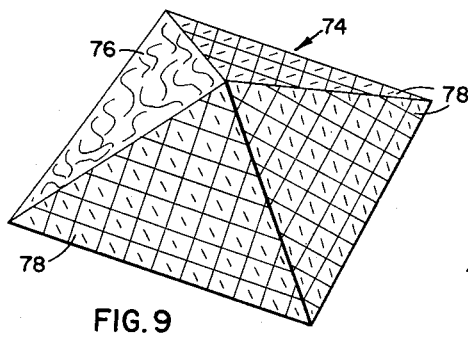
Figure 10:
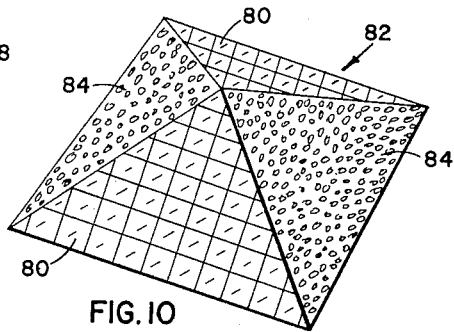

FIGURES 8, 9 and 10 show various other possibilities, however, it should be noted that none of these are interchangeable with each other by rotation about the pyramidal axis, and that such rotation produces a different configuration. FIGURE 8 shows a pyramidal structure 70 having four light absorptive and sound absorptive sides 72, such as might be used in laboratories, eating establishments and such, to subdue glare and noise from all angles. FIGURE 9 shows a pyramidal structure 74 having a configuration in which one side 76 which is light absorptive and sound reflective, and the other three sides 78 which are light reflective and sound absorptive. A tile utilizing the pyramidal structures of FIGURE 9 could be used near a window, where light reflections should be minimized but sound should not be muted, while the remainder of the room should be brightened and sound should be deadened. Such a situation might occur in a patient observation room of a hospital. FIGURE 10 shows yet another possibility in the construction of a tile, where two sides 80 of a pyramid 82 are light reflective, sound absorptive and the other two sides 84 are light and sound absorptive. Such a situation might occur where a wall would be lightened by the reflected light, while the rest of the room was darkened, all of the room being soundproofed.

Thus, it is apparent that there are four different combinations of light and sound absorptive and reflective properties possible for the pyramidal structures on each tile:

(1) light absorptive, sound absorptive
(2) light absorptive, sound reflective
(3) light reflective, sound reflective
(4) light reflective, sound absorptive There are, further eight different combinations of relative positional arrangements of treated pyramid surfaces, as illustrated in FIGURES 11 through 18 inclusive.

Figure 17:
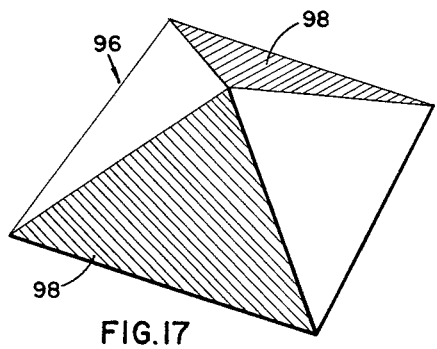
FIGURES 11 through 18 show the possible relative positional arrangements of the surfacing treatments on the tile.
Figure 18:
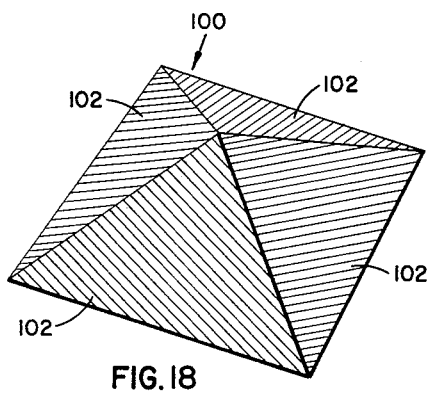
Figure 11:
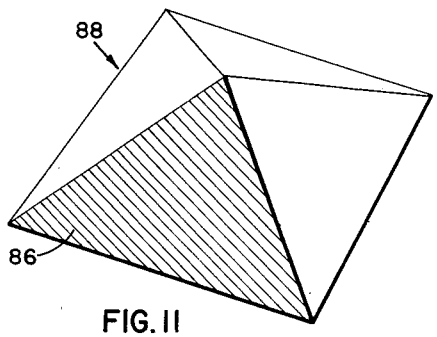
Figure 12:
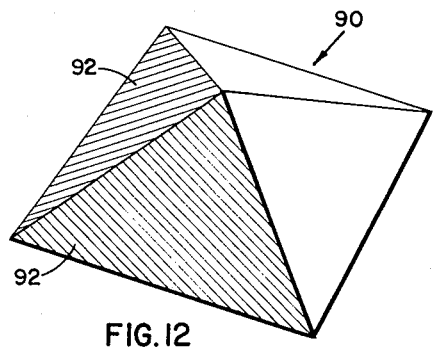
Figures 13, 14:
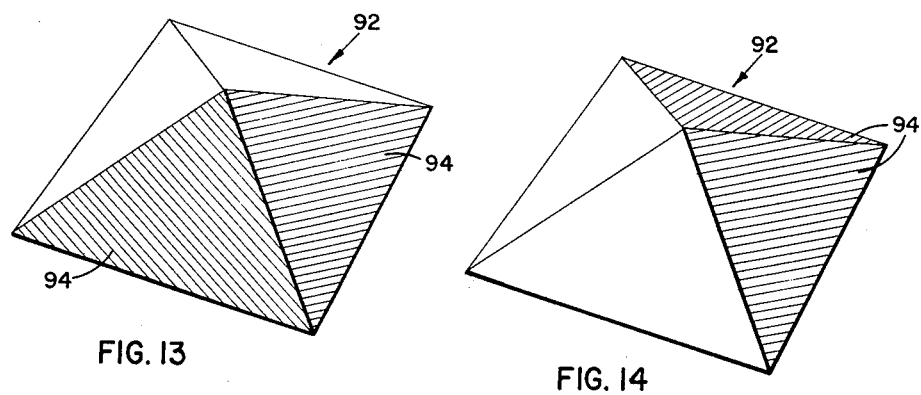
Figures 15, 16:
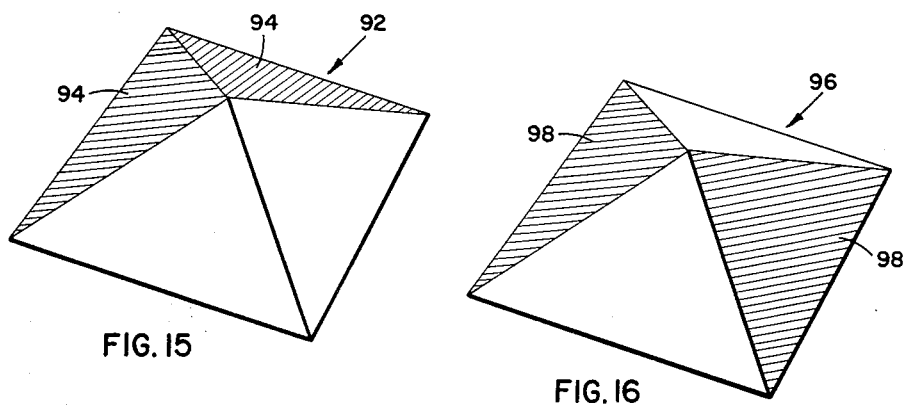

FIGURE 11 shows the simplest situation, where only one face 86 of a pyramid 88 is surfaced with a given preparation. Up to four possible forms may be had, in this case, by simple rotation of the particular determined surface of the pyramid, depending upon the other surfaces of the tile. This rotation in space changes the nature of the tile, in relation to other possible facings on the same tile. In FIGURE 12, there is shown a pyramid 90 in which two adjacent faces 92 are surfaced. Spatial relative rotation of these faces can also effect the configuration of the tile, as shown in FIGURES 13, 14 and 15. From these illustrations it can be seen that there are four relative positions possible to two adjacent faces, unlike the single face, where relative rotation may produce up to four variations. FIGURE 16 shows a case where a pyramidal structure 96 has two opposing sides 98 which are surfaced. It logically follows that, with opposing sides, there are only two possibilities. The first, as shown in FIGURE 20 and the second as illustrated in FIGURE 17. FIGURE 18 shows the final possibility of a pyramidal structure 100 wherein all sides 102 are surfaced. A case where 3 sides are surfaced is equivalent to the obverse of the pyramid shown in FIGURE 11. Thus it can be empirically determined that the number of permutations is 70.

The manufacture of this tile presents many possibilities of simplified procedure. Acoustic tiles of the usual perforated type are gang-drilled by a battery of twist drills. These twist drills dull readily, and must be replaced often. (Some tile materials require replacement for each 100 tiles drilled.) Since the tiles of this invention obviously eliminate the drilling operation, they may be made more cheaply. The tiles may be molded or formed, but the preferred manner of manufacture is to cut a solid block of acoustic material with mutually crossing right-angled cuts into the tile, in order to produce the pyramidal shapes needed. The cutting may be done by means of a toothless blade, which can be sharpened in operation, thus eliminating shutdowns for drill sharpening and replacement. The cutting operation may be accomplished by producing a number of first parallel angular cuts into but not through the sheet of material from which the tile is to be made, and cutting a number of second parallel angular cuts, these second cuts making a juncture with the first cuts at their respective points of deepest penetration, thus forming a wedge-shaped piece which is removed. This process is repeated, to make third and fourth obliquely angled cuts at right angles to the first and second, thus forming, by removal of the wedge-shaped pieces resulting from the third and fourth cuts, a serried array of pyramidal structures on a base sheet.

The coating and preparation of the specially treated surfaces may be accomplished by spraying or painting. If sprayed, the spray can be directed from such an angle as to catch only one face at a time. This technique lends itself well to production line continuous manufacture, as does the cutting of the tiles. Both sound and light affecting preparations may be applied in this manner. These techniques provide a means of continuously producing these acoustico-illuminative tiles.

It is understood that the foregoing specification of the invention, explained in connection with specific exemplifications thereof, will suggest many other applications and modifications of the same. It is accordingly desired that, in construing the breadth of the appended claims, they shall not be limited to the specific details shown and described in connection with exemplifications thereof. Therefore what is claimed and it is desired to secure by Letters Patent of the United States is:

1. A tile for controlling both sound and light, said tile comprising a pyramidal projection having four triangular faces, two of said faces disposed opposite each other and having thereon means for absorbing sound and reflecting light, the other two of said faces disposed opposite each other with one of said other faces having thereon means for absorbing both sound and light and the second of said other faces having thereon means for reflecting both sound and light.

2. A tile for controlling both sound and light, said tile comprising a plurality of contiguous pyramidal projections, each of said projections having four triangular faces, some faces on said projections turned toward a common direction with each such face having thereon means for controlling both sound and light reflected therefrom, others of the faces on said projections turned toward another common direction with each of said other faces having means thereon for controlling both sound and light reflected therefrom, the controlling means on the faces turned toward one direction having different sound and light reflecting properties from the controlling means on the faces turned toward the other direction.

References Cited in the file of this patent

UNITED STATES PATENTS

| | | |
|---|---|---|
| 1,825,465 | MacDonald | Sept. 29, 1931 |
| 1,845,080 | Eyring et al. | Feb. 16, 1932 |
| 1,864,153 | Solon | June 21, 1932 |
| 1,900,203 | Seiler | Mar. 7, 1933 |
| 2,543,405 | Hayes | Feb. 27, 1951 |
| 2,714,816 | Pennell | Aug. 9, 1955 |
| 2,859,781 | Edmundson | Nov. 11, 1958 |
| 2,977,591 | Tanner | Mar. 28, 1961 |
| 3,007,539 | Brewer et al. | Nov. 7, 1961 |

FOREIGN PATENTS

| | | |
|---|---|---|
| 650,313 | France | Sept. 18, 1928 |
| 530,328 | Great Britain | Dec. 10, 1940 |
| 1,238,340 | France | July 4, 1960 |

OTHER REFERENCES

"Darkflex—A Fibrous Microwave Absorber," by H. A. Tanner et al., NRL Report 4137, Naval Research Laboratory, Washington, D.C., dated April 20, 1953, pages 6–8 of particular pertinence.